(12) United States Patent
Harmon

(10) Patent No.: US 6,295,696 B1
(45) Date of Patent: Oct. 2, 2001

(54) VACUUM APPARATUS FOR CLEANING CONDENSERS AND THE LIKE

(76) Inventor: Richard Harmon, E13492 State Rd. 33, Baraboo, WI (US) 53913

( * ) Notice: Subject to any disclaimer, the term of this patent is extended or adjusted under 35 U.S.C. 154(b) by 0 days.

(21) Appl. No.: 09/451,235

(22) Filed: Nov. 29, 1999

(51) Int. Cl.[7] .................................................. A47L 5/14
(52) U.S. Cl. ................................................ 15/345; 15/346
(58) Field of Search ...................................... 15/345, 346

(56) References Cited

U.S. PATENT DOCUMENTS

| | | | |
|---|---|---|---|
| 1,620,390 | * | 3/1927 | Peters ....................................... 15/346 |
| 2,818,595 | * | 1/1958 | Rosewall ............................... 15/345 X |
| 3,220,042 | * | 11/1965 | Harrington ........................... 15/346 X |
| 3,510,905 | * | 5/1970 | Bannert ................................... 15/345 |
| 4,037,290 | * | 7/1977 | Roxe et al. ............................. 15/345 |
| 4,333,201 | | 6/1982 | Rohner . |
| 4,670,062 | * | 6/1987 | Lester ................................ 15/345 X |
| 4,780,927 | * | 11/1988 | Clayton ................................... 15/345 |
| 5,276,938 | | 1/1994 | Cadwell, Jr. et al. . |
| 5,333,354 | * | 8/1994 | Takemoto et al. ................. 15/346 X |
| 5,515,698 | | 5/1996 | Sawazaki et al. . |
| 5,768,740 | | 6/1998 | McBride et al. . |
| 5,941,766 | | 8/1999 | Iversen . |

FOREIGN PATENT DOCUMENTS

552732 * 12/1956 (IT) ....................................... 15/346

* cited by examiner

Primary Examiner—Chris K. Moore
(74) Attorney, Agent, or Firm—Joseph T. Leone, Esq.; DeWitt Ross & Stevens S.C.

(57) ABSTRACT

Disclosed herein is a combination vacuum cleaning apparatus. The apparatus includes, in combination, means for sealing an area to be cleaned against the passage of dirt therefrom, such as a skirt; a vacuum source for creating a high-pressure zone within the area enclosed by the skirt and a low-pressure zone within the area enclosed by the skirt; and an intake manifold positioned at the low-pressure zone and operationally connected to the vacuum source to conduct dirt away from the area to be cleaned.

5 Claims, 5 Drawing Sheets

VACUUM APPARATUS FOR CLEANING CONDENSERS AND THE LIKE

BACKGROUND

Vacuum cleaners for cleaning carpets and shop-type vacuum cleaners for disposing of sawdust and other industrial waste have been available for years. However, these devices are designed generally to clean large areas of space and are not particularly well-suited for cleaning small, cluttered, and partially-enclosed areas.

Tank vacuum cleaners often come with attachments for cleaning hard-to reach spaces, such as cracks and crevices. Again, however, if the area to be cleaned is quite dirty and cluttered with immovable objects, coaxing dirt from the area using a conventional vacuum cleaner is a difficult proposition.

Of particular concern in virtually all U.S. households is the dirt which accumulates around the condenser coils and motors of refrigerators, freezers, air-conditioners, and the like. Virtually every U.S. household has at least one refrigerator whose exposed condenser coils and motor will, over time, collect a truly vast amount of dirt and lint. Not only is the dirt unsightly and potentially unhealthy (especially for allergy sufferers), it also reduces the efficiency of the refrigerator or freezer because the heat-transfer capacity of the condenser coils is reduced due to the presence of the dirt. Consequently, by removing the dirt, not only is the house made more cleanly, the refrigerator or other device is restored to maximum efficiency.

However, as alluded to above, the underside of most refrigerators, freezers, and similar devices, are notoriously cluttered. Gaining access to such a restricted space with conventional vacuum cleaners is impossible. Owing to the large size of such devices, they cannot easily be tipped onto their sides and the underside then thoroughly cleaned. Consequently, there is a long-felt need for a device which will allow the underside of a refrigerator, freezer, or any large workpiece to be vacuum cleaned simply, easily, and without spreading dirt around the home or workplace. The present invention is such a device.

A number of vacuum assemblies for cleaning work areas, textile machines, and the like, are described in the prior art. For example, U.S. Pat. Nos. 5,515,698 and 4,333,201 describe vacuum devices for cleaning bobbin creels or other textile machinery which tend to accumulate fabric dust. U.S. Pat. No. 5,941,766 to Iverson describes a cone-like dust collector to be used in conjunction with a grinding machine to collect the shavings. U.S. Pat. No. 5,276,938 describes a workstation which uses an integrated vacuum system to recover liquid freon before it vaporizes. U.S. Pat. No. 5,768,740 describes a vacuum apparatus for removing debris from a work site.

None of the devices described in the above-noted patents anticipate or render obvious the invention described and claimed herein.

SUMMARY OF THE INVENTION

The invention is directed to a vacuum cleaning apparatus comprising, in combination, means for sealing an area to be cleaned against the passage of dirt therefrom; vacuum means for creating a high-pressure zone within the area to be cleaned and a low-pressure zone within the area to be cleaned; and an intake manifold positioned at the low-pressure zone and operationally connected to the vacuum means. Using this combination of elements, air within the high-pressure zone is forced toward the low-pressure zone, whereby dirt within the area to be cleaned is propelled into the intake manifold and conducted to a area remote from the area to be cleaned.

The principal advantage of the present invention is that it allows congested areas where physical access is limited, such as refrigerator coils and the like, to be thoroughly cleaned without spreading dirt and dust throughout the household.

A skirt or other means to seal a confined area from the passage of dirt is wrapped about an area to be cleaned. A vacuum introduces a high-pressure zone within the skirt, as well as a low-pressure zone, also within the skirt, but removed from the high-pressure area. This creates a current of air within the area surrounded by the skirt which propels dirt from the high-pressure zone to the low pressure zone, where the dirt is then conducted to an area removed from the area to be cleaned.

DETAILED DESCRIPTION

Figure 1:
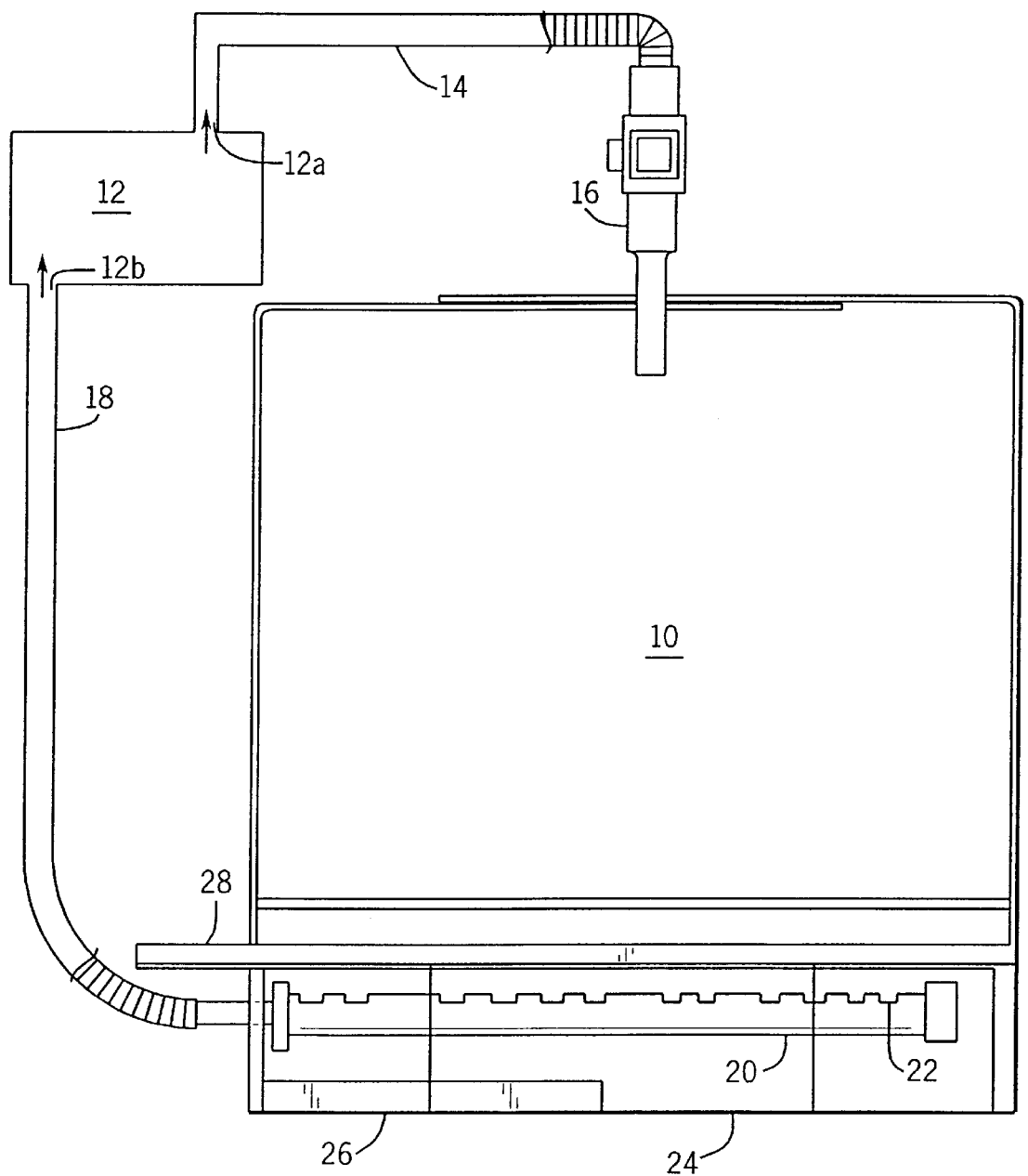
FIG. 1 is a top plan view of the preferred embodiment of the present invention.
Figure 2:
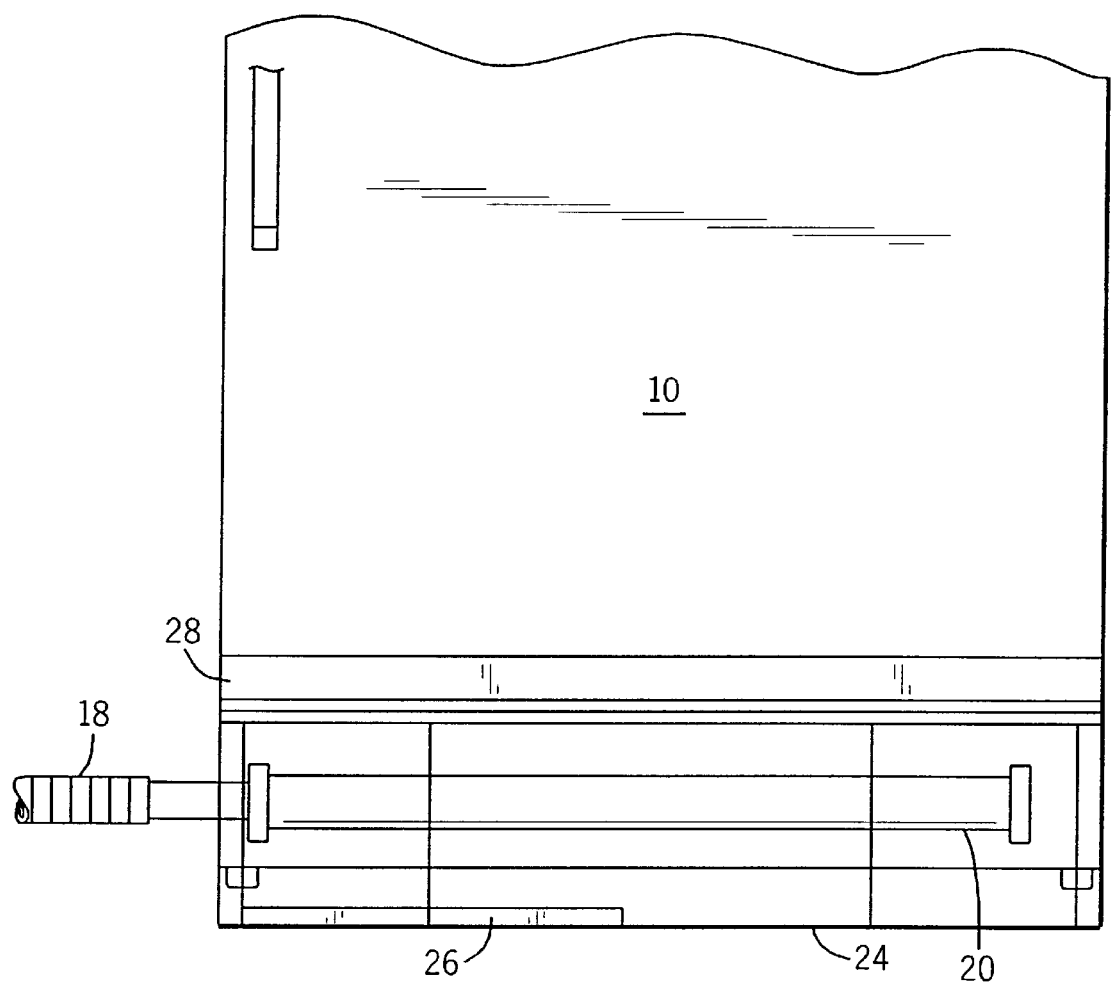
FIG. 2 is a front elevational view of the embodiment shown in FIG. 1.
Figure 3:
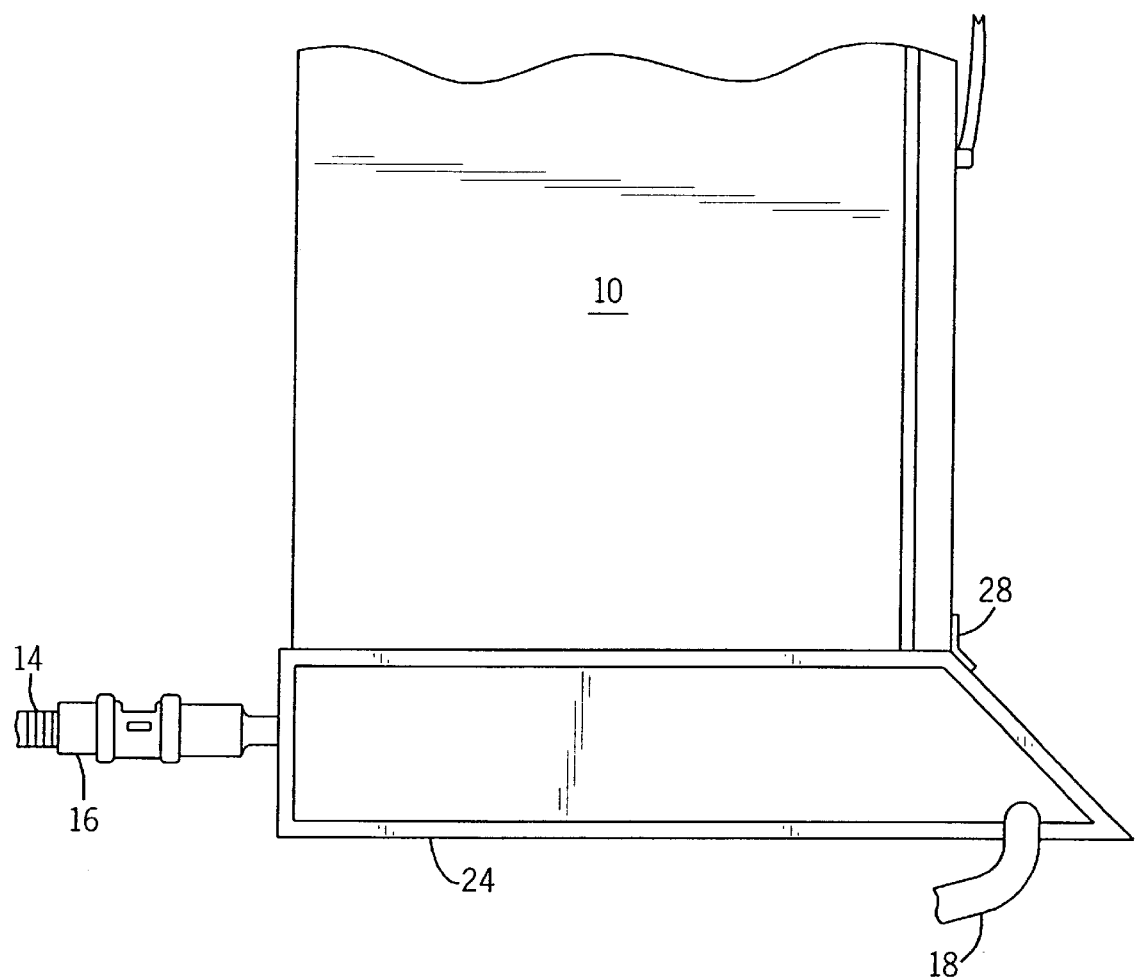
FIG. 3 is a right-side elevational view of the embodiment shown in FIG. 1.
Figure 4:
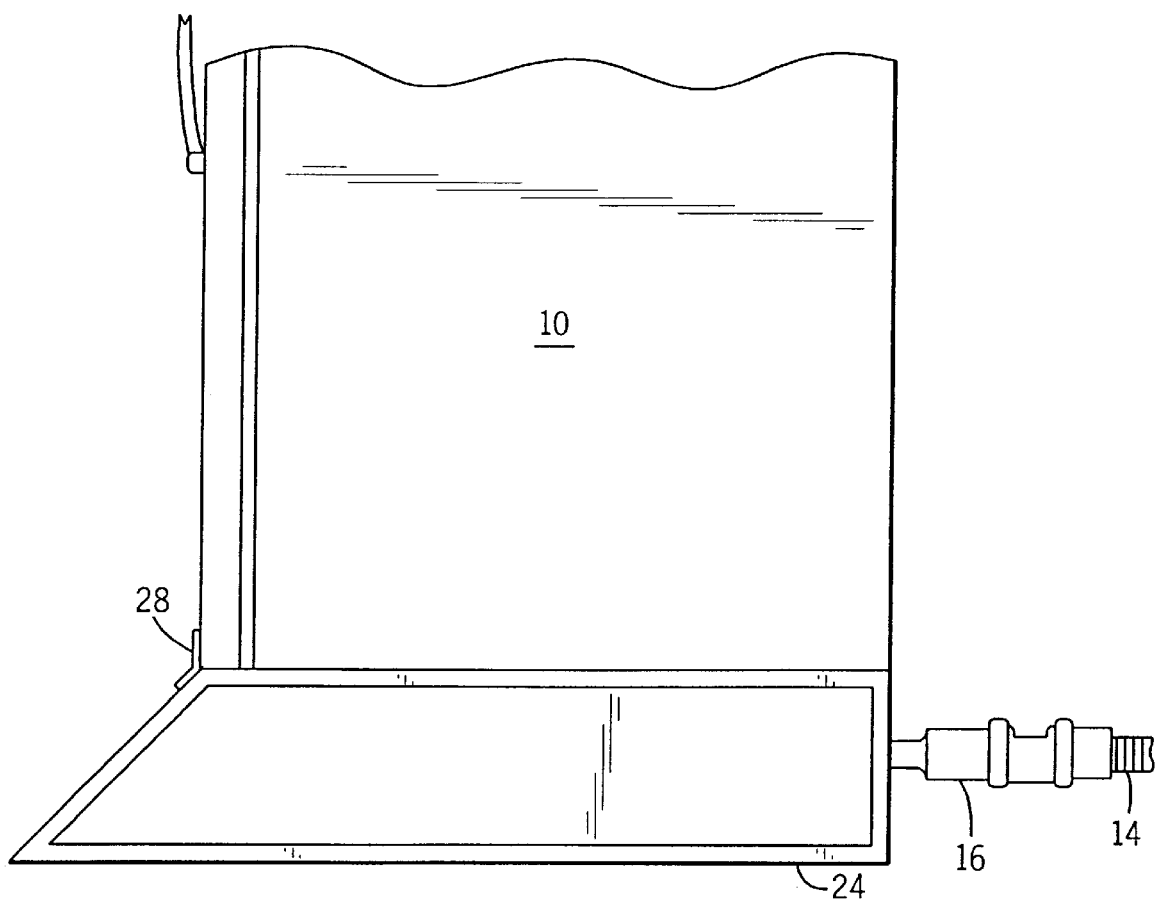
FIG. 4 is a left-side elevational view of the embodiment shown in FIG. 1.
Figure 5:
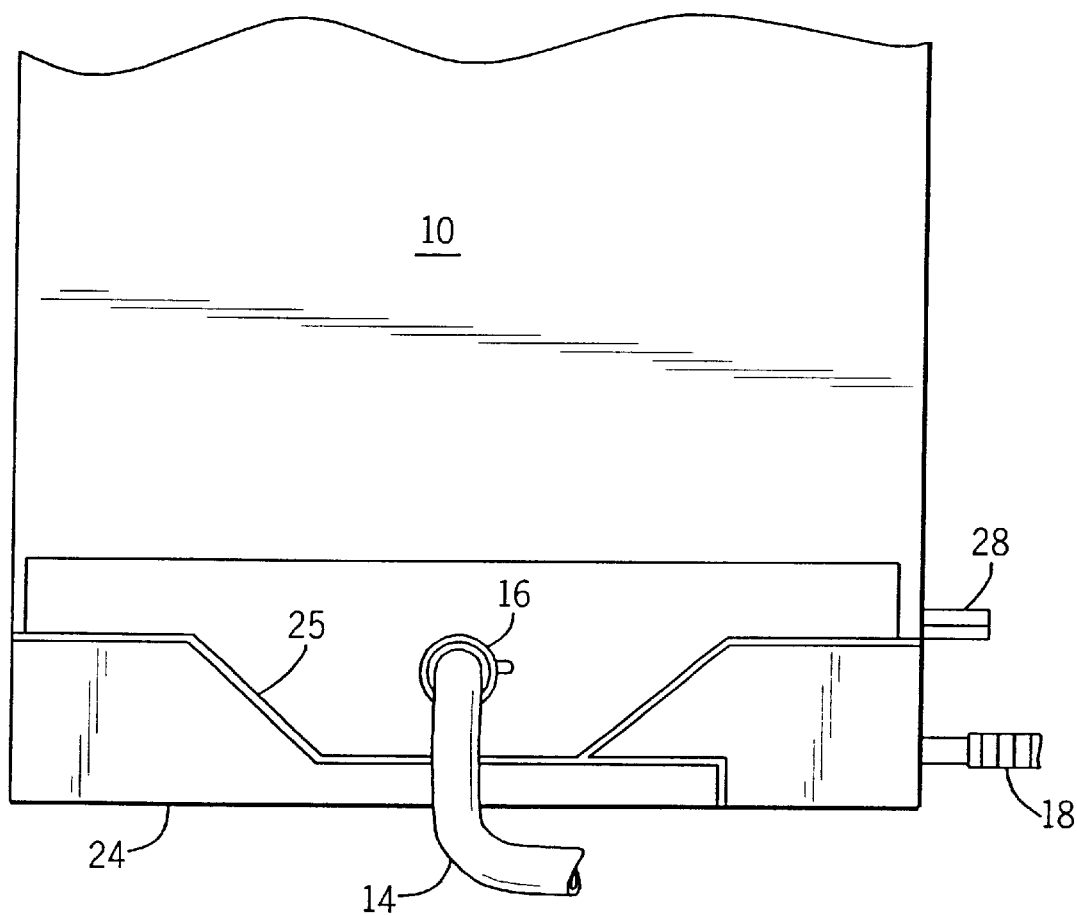
FIG. 5 is a rear elevational view of the embodiment shown in FIG. 1.

Referring now to FIG. 1, which is a top plan view of the preferred embodiment of the invention, a workpiece, such as a refrigerator 10, is shown. The refrigerator 10 is for illustration only and forms no part of the invention. Wrapped around the area of the workpiece to be cleaned is means 24 for sealing the area against the passage of dirt, lint, and the like. See also FIGS. 3 and 4. As shown in the figures, the means for sealing against the passage of dirt is a skirt of suitably impervious material, such as plastic sheeting, cloth, paper, leather, and the like. Preferably, the skirt is sufficiently pliable to wrap around workpieces of different dimensions, yet stiff enough to act as a seal against the passage of dirt. For instance, if the skirt is made of cloth or thin plastic sheeting, it may be stiffened by incorporating internal supporting structures into the skirt, such as bendable metal supports (in the same fashion as the fabric of an umbrella is supported by an internal skeleton).

The skirt 24 is releasibly disposed around the workpiece 10 using closure means 26. The closure means can be any suitable means for releasibly affixing the skirt about the area to be cleaned, and includes, without limitation, buttons, snaps, adhesives, hooks and eyes, and hook and eye type closures such as "VELCRO"-brand closures. The nature of the closure means is not critical to the operation of the invention, so long as the means chosen reliably seals the skirt 24 about the workpiece 10.

Vacuum means 12 are provided. The vacuum means includes an exhaust port 12a and an intake port 12b, the direction of air displacement being indicated by the arrows in FIG. 1. The vacuum means, hereinafter referred to simply as the vacuum, can be any type of vacuum apparatus which provides an exhaust port which vents high-pressure air (i.e. air pressurized greater than ambient pressure) to create a high-pressure zone, and an intake port wherein air-pressure at the mouth of the intake port is less than ambient pressure, to create a low-pressure zone. As shown in FIG. 1, and which is preferred, the vacuum 12 is a single, integrated unit having both an intake port and an exhaust port. Preferably, the vacuum 12 is a shop-type cannister vacuum. However, when cleaning very large installations, it may be preferred that the vacuum means be embodied in two separate units, one unit providing the high-pressure air, and the other unit providing the low-pressure inlet.

Attached to the exhaust port 12a of vacuum 12 is an exhaust conduit 14, which is in turn attached to an exhaust nozzle 16. As shown in FIGS. 1, 3, 4, and 5, the exhaust nozzle 16 extends over the skirt 24, at cut-out 25 (see FIG. 5), thereby introducing high-pressure air into the area sealed by the skirt 24. Alternatively, the exhaust nozzle 16 may optionally extend through an aperture in the skirt 24, thereby eliminating the need for the cut-out 25.

Similarly, attached to the intake port 12b of vacuum 12 is an intake conduit 18, which is attached to an intake manifold 20. As shown in FIGS. 1, 3, 4, and 5, the intake conduite 18 extends through an aperture in the skirt 24 at a point removed from the position where the exhaust nozzle introduces high-pressure air into the area sealed by the skirt 24.

The intake manifold 20 includes a plurality of apertures 22 passing therethrough which provide fluid passage from the space inside the conduit 18 to the space enclosed by the skirt 24.

At the top of the skirt 24, at or about the point where the intake manifold 20 is disposed, is a top seal 28. The top seal functions in two ways: first, it keeps dirt from exiting the area surrounded by the skirt 24, and it also inhibits air from outside the skirt entering at the area of low air pressure surrounding the intake manifold 20. In operation, when the vacuum 12 is turned on, the area immediately surrounding the intake manifold 20 will be at a lower pressure than ambient. The top seal 28 helps to maintain this low pressure area.

In operation, the skirt 24 is placed around a workpiece, such as the lower portion of a refrigerator 10 whose condenser coils, motor, etc., are fouled with dirt and lint. The skirt 24 is releasibly sealed around the workpiece using the closure means 26. As shown in the figures, the exhaust nozzle 16 is then positioned at the rear of the refrigerator, inside the skirt 24, and the intake manifold 20 is positioned inside the skirt at the front of the refrigerator, with the apertures 22 pointing generally toward the exhaust nozzle 16.

At this point, the vacuum 12 is turned on. The vacuum drives high-pressure air out of the exhaust nozzle 16, thereby creating a high-pressure zone within the skirt. The high-pressure air blows dirt from the area to be cleaned toward the intake manifold 20, a low-pressure area, where the dirt is then sucked into the intake manifold and vented to the vacuum 12, where it is collected in a suitable hopper, cannister, or bag for disposal.

The invention is not limited to the exact description of elements noted above, but encompasses all such equivalents thereof as fall within the scope of the attached claims.

What is claimed is:

1. A vacuum cleaning apparatus for cleaning an area proximate to a workpiece comprising, in combination:

means for sealing an area to be cleaned against the passage of dirt therefrom, the area being proximate to a workpiece, wherein the means for sealing is a flexible skirt disposed about the workpiece and encompassing the area proximate to the workpiece, the flexible skirt having a top peripheral edge and a bottom peripheral edge, and further comprising a seal dimensioned and configured to contact the workpiece such that passage of air and dust to and from the area encompassed by the skirt is inhibited, the seal disposed about the top peripheral edge of the skirt, and closure means for releasibly affixing the skirt about the workpiece;

vacuum means for creating a high-pressure zone within the area to be cleaned and a low-pressure zone within the area to be cleaned;

an intake manifold positioned at the low-pressure zone and operationally connected to the vacuum means; wherein air within the high-pressure zone is forced toward the low-pressure zone, whereby dirt within the area to be cleaned is propelled into the intake manifold.

2. The vacuum cleaning apparatus of claim 1, wherein the skirt is fabricated from a material selected from the group consisting of cloth, plastic, leather, and combinations thereof.

3. The vacuum cleaning apparatus of claim 1, wherein the vacuum means is disposed outside of the area to be cleaned.

4. The vacuum cleaning apparatus of claim 1, wherein the vacuum means is a cannister-type vacuum cleaner.

5. The vacuum cleaning apparatus of claim 1, wherein the intake manifold includes a plurality of apertures passing therethrough.

* * * * *